United States Patent

[11] 3,597,794

[72] Inventor Charles G. Mann
 Farmington, Mich.
[21] Appl. No. 779,949
[22] Filed Nov. 29, 1968
[45] Patented Aug. 10, 1971
[73] Assignee Weltronic Company
 Southfield, Mich.

[54] MULTIFUNCTION PRODUCTION MONITOR
 11 Claims, 3 Drawing Figs.
[52] U.S. Cl. .................................................. 18/2 HA,
 18/16 C, 18/17 C, 324/73
[51] Int. Cl. ........................................................ B29g 1/00
[50] Field of Search ............................................ 18/2 I, 16
 C, 17 C; 324/73

[56] References Cited
 UNITED STATES PATENTS
 3,000,003 9/1961 Einsel ........................... 340/172.5
 3,339,227 9/1967 Ehrenfreund ................. 18/2

Primary Examiner—William S. Lawson
Attorney—Wilson & Fraser

ABSTRACT: A system for monitoring the production of a work station wherein a plurality of process functions must be performed for a satisfactory product. The plurality of functions are sensed in the system to actuate a product count. The functions can be defined by limits on a range as temperature, pressure or curing time. Sequencing of the functions can be critical as where pressure must be imposed prior to heating an article being processed to produce a count of a satisfactory product. Combinations of function limits and sequences of functions can be utilized to indicate an acceptable process cycle. Several processes can be imposed on the product with a grading of the final product dependent upon the grading of intermediate product and process parameters. Several grades of product can be sensed and counted in the system depending upon the values or sequences of functions being performed. For example, a cure time outside the limits for a prime grade product, if within the looser limits of a secondary grade product causes the resultant product, other functions being within limits, to be counted as a secondary grade product.

INVENTOR
CHARLES G MANN

BY
Wilson & Fraser
ATTORNEYS

INVENTOR.
CHARLES G. MANN
BY
Wilson + Fraser
ATTORNEYS

INVENTOR.
CHARLES G. MANN

BY
Wilson & Fraser
ATTORNEYS

MULTIFUNCTION PRODUCTION MONITOR

SUMMARY OF THE INVENTION

This invention relates to production monitoring systems and more particularly to such systems which require two or more production parameters to be met to generate an indication of a satisfactory production cycle.

Heretofore it has been known to monitor production whereby a cycle count is maintained by sensing a function which occurs in each production cycle, as the advance of a press crosshead. It has also been known, as exemplified in Mann U.S. Pat. 3,321,704 which issued May 23, 1967 for "Apparatus for Monitoring Deviations from Production Standards," to define a range of acceptability of one function of a process, e.g. time or temperature, and to count those occurrences which are on the low side of the range in one counter and those on the high side in another counter. Other systems for the control of processes have monitored several parameters, and when the process results in a deviation of a parameter, the systems have issued corrective signals to the processing apparatus. The present system is arranged to provide a count of a useful processing cycle or the production of an acceptable product only when a plurality of parameter limits have been met during that cycle or the production of the article. It also will grade and count graded products according to the relationship of production parameters.

An object of this invention is to improve production monitoring.

Another object is to ascertain only acceptable productive cycles at a work station.

Another object is to count productive cycles only when predetermined combinations of production parameters are sensed during the cycles.

A fourth object is to grade products or productive cycles according to the combination value or sequence of a plurality of productive parameters.

In accordance with the above objects, means are provided for sensing a plurality of production functions or parameters of one or more production cycles performed on a product at a work station or a related series of work stations. The functions or parameters, which may be a physical motion, pressure of a given value, temperature of a given magnitude, a voltage or current, or the time interval over which one, more of these parameters are imposed or suitable ranges of these parameters in suitable relationship. Means are included to respond to appropriate combinations of the variables either in the form of combinations of coincidence and anticoincidence responsive means to actuate registers or other information utilization devices or as inputs to a computer which is programmed to react in an appropriate manner to the combinations as an acceptable or unacceptable cycle or product. A typical elementary form of response is a count of a "first grade" product when the processing parameters are each within the limits and properly related in the sequence for producing such a product and no count or a lower grade count when any parameter is outside of one of those limits or in an improper sequential relationship.

DETAILED DESCRIPTION OF THE DRAWINGS

Figure 1:
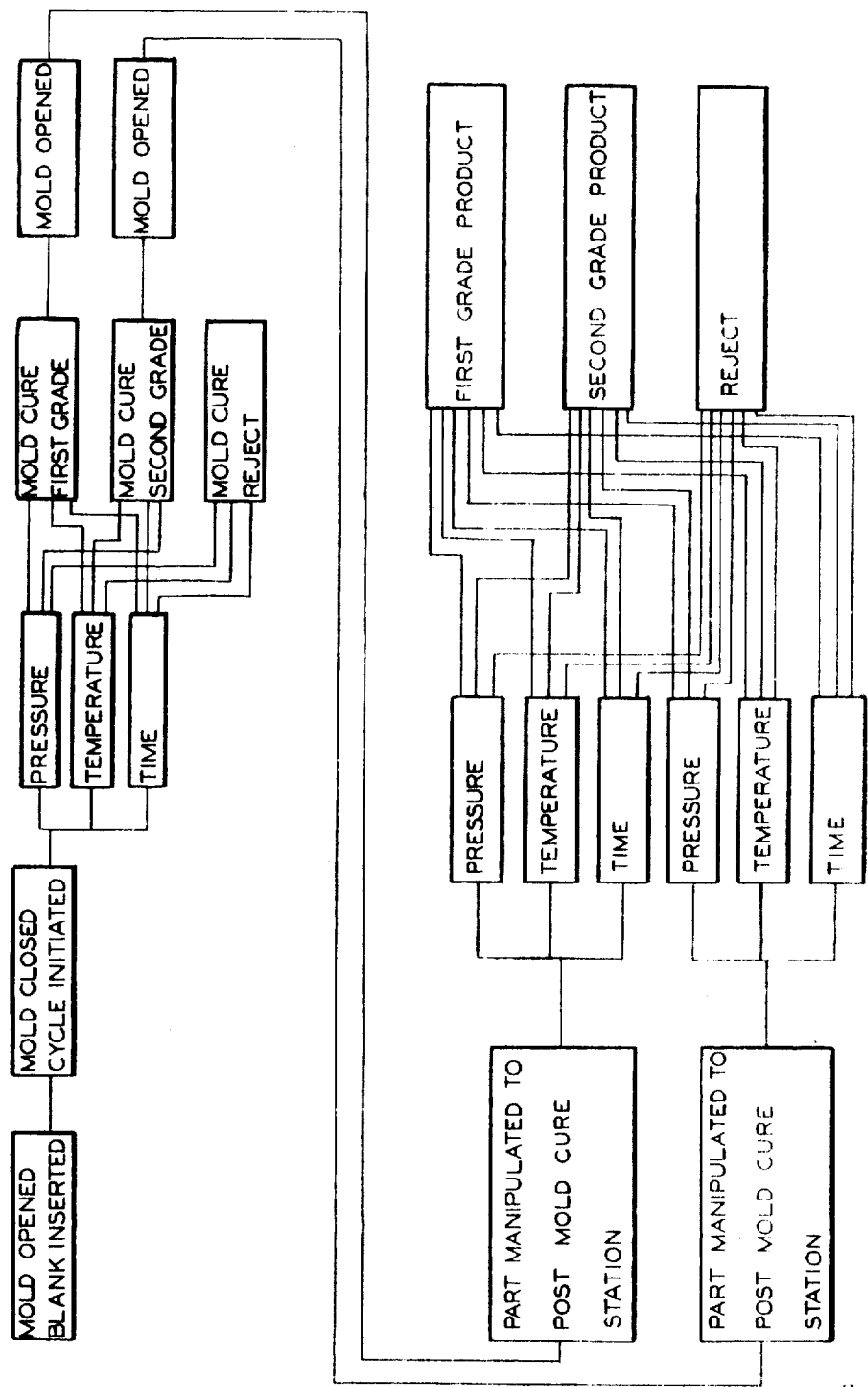
Figure 2:
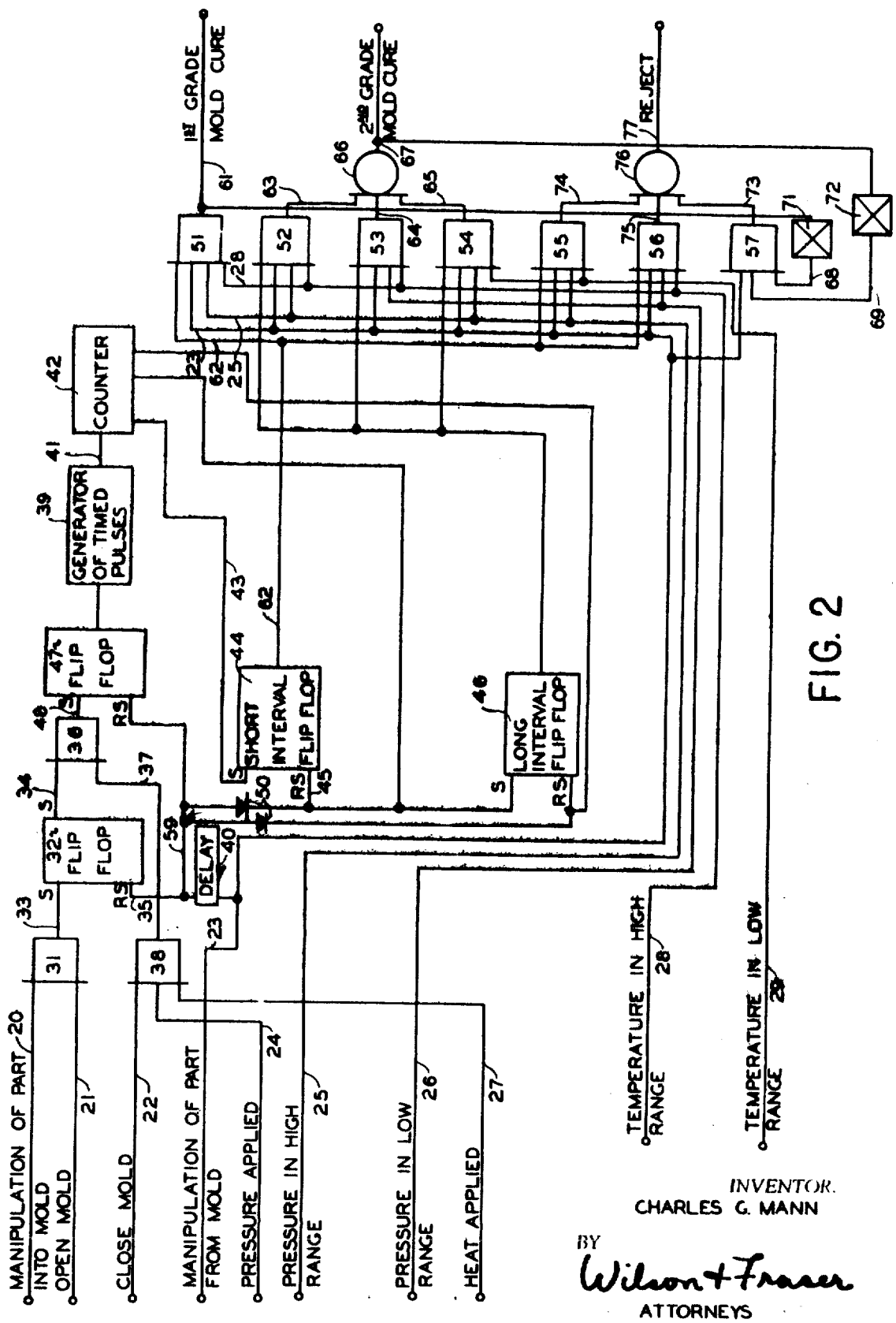
Figure 3:
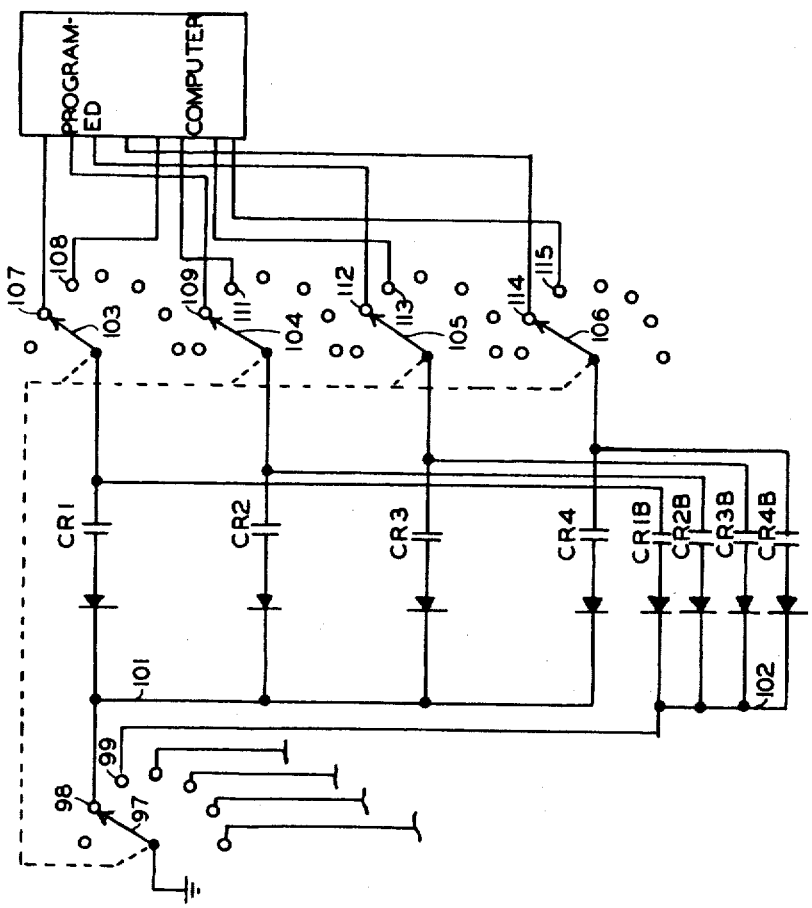
Figure 3:
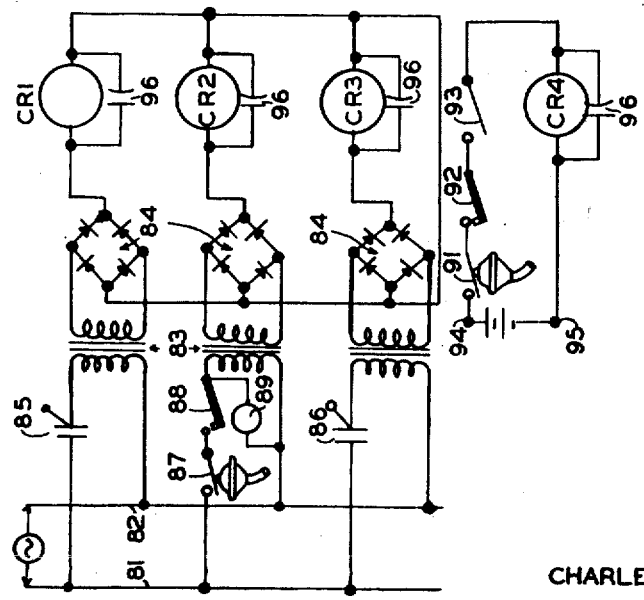

The above and other objects and features will be more fully appreciated from the following detailed description when read with reference to the accompanying drawings in which:

FIG. 1 is a functional block diagram of a typical monitoring sequence for a two stage process according to this invention;

FIG. 2 is a logic diagram of a typical monitoring circuit embodying the present invention as applied to an exemplary production system of one process stage to produce grade counts and reject counts; and FIG. 3 is a composite schematic and block diagram of the monitoring system coupling transducers at a work station with an on the line computer addressed and programmed to scan its inputs for the monitoring function and respond to production cycles in the manner set forth for FIGS. 1 or 2.

DETAILED DESCRIPTION OF THE PREFERRED EMBODIMENT

The application of the monitoring concept of this invention is illustrated in FIG. 1 as applied to a mold cured blank which is subjected to pressure, and temperature within certain limits for a time interval to effect a first phase of the formation and cure of the final product and to a cure subsequent to removal from the mold which can be subject to pressure, as where an inflatable bladder is contained in the product, and/or temperature for a time interval. In such processes the cure at the several stages is a function of the relationship of pressure, temperature and time such that the quality of the product will depend upon the relationship of these process parameters. Time between the process stages for a product can affect its quality. Thus, within limits, substantially the same degree of cure can be achieved by subjecting the blank to a relatively high temperature for a relatively short interval as by subjecting it to a relatively low temperature for a relatively long interval. Variations in the degree of cure will follow the relationship of parameters such that for predetermined relationships or ranges of such relationships the product will fall within a grade as, first grade, second grade or reject. Where other process parameters are involved, these also enter in the quality of the final product. A product molded with an internal bladder to which pressure is applied to cause the blank to conform to the mold will vary in quality with the pressure level established and/or sustained during the period it is in the mold. Similarly, physical or electrical characteristics of the product during processing can be monitored in conjunction with the other processing parameters as a measure of the quality of the product.

Where successive process are applied to the product it can be graded in one of the initial processes according to the relationship of the parameters of that process and selected grades can be further graded in accordance with the relationship of the parameters in subsequent processes. Rejects of an initial process are withdrawn from the sequence in the interest of economy. In certain processes where an intermediate product can be upgraded the subsequent processing stages if subjected to appropriate processing parameters can result in an upgrading of the product. Monitoring of the subsequent stages can relate the preceding grading of the intermediate product and one or more parameters of the precess applied to the intermediate product to indicate a grade dependent upon the relationship. Thus a second grade intermediate product subjected to proper parameters can be graded and counted as a first grade product from the subsequent process stage.

In FIG. 1 the monitoring of a cycle is initiated when the mold is opened, a blank inserted therein, and the mold closed. The process controller (not shown) can then program a working cycle or the cycle can be manually controlled. Significant parameters of the cycle are monitored in combination as "pressure," "temperature" and "time." Each of these parameters when related to every other parameter monitored can result, depending upon its value and the values of the other parameters, in varying levels of quality as either a first grade, a second grade or a reject of the intermediate product of the mold cure.

Further processing of the reject in the normal sequence is unwarranted. An acceptable intermediate product is further monitored according to this invention as it is processed. The mold is opened and the part manipulated to a post mold cure station where it is subjected to further curing while the process is monitored. As in the mold, curing can involve the application of pressure and temperature to the intermediate product for a time interval and the degree of cure can determine the quality of the final product. "Pressure," "temperature" and "time" (the final cure interval) are all monitored in the example. As in the case of the mold cure, a part can fall into various quality levels depending upon the combination of parameters in the cure. The combination monitored is thus employed to indicate the grade of the product.

Two channels of monitoring of the second cure are employed, one for first grade mold cure products and another for the second grade mold cure products. Usually the second cure will not enhance the grade of the ultimate product hence a first grade mold cure product can result in either a first grade, second grade or reject final product dependent upon the combination of parameters in the post mold cure according to the grading principles of the mold cure. Ordinarily, a second grade mold cure product cannot be upgraded to a first grade final product; however, in some processes the application of corrective final cure parameters can achieve a product improvement. Therefore, as illustrated in FIG. 1, certain combinations of final cure pressure, temperature and time applied to a secondary grade mold cure are shown to result in a first grade final product by the flow lines extending from the secondary grade channel to the first grade part count.

In some processes the time interval between a first process, the mold cure in the example, and a second process can be indicative of the quality of a final product. Thus this time can be monitored and be entered into the logic of the grading of the product of the second process.

The resultant grade count can be employed in the production and inventory control of the plant and individual monitoring sequences can actuate automatic grade marking of the product of the sequence (by means not shown) or the routing of the product from the work station (by means not shown).

The logic diagram for a monitoring system for the first processing stage according to FIG. 1 is shown in FIG. 2. Input signals for this circuit are derived from limit switches responsive to the placement of blank in the mold, opening of the mold, to the closing of the mold, and to the transfer of the cured part from the mold to its next station in the plant. These switches respectively impose signals on leads 20, 21, 22 and 23 as labeled in the drawing. Pressure responsive devices can be of the type which close a circuit when a given pressure is imposed, as can be employed to impose a signal on lead 24, or of a type which close a circuit for a range of pressure and open the circuit when the pressure is either above or below that range, as can be coupled to leads 25 and 26. The signal to lead 24 alternatively can be responsive to the opening of a valve in the processing sequence. Application of heat as indicated by a signal on lead 27 can also result from the operation of the controls to initiate the application or the actual sensing of heat as by a thermally actuated switch. Definition of suitable operating ranges of temperatures result, for the high range of acceptable temperatures in the mold, in a signal on lead 28, and, for the low range of acceptable temperatures in the mold, in a signal on lead 29. These temperature range signals may be by thermostatic switches which are closed over the range of temperatures to be defined and are open above and below that range or can be thermocouple actuated.

The electrical signal circuit depicted in logic form utilizes conventional circuits which preferably may be of solid-state type active elements although electron discharge devices can be employed for the active element. Coincidence gates which have a plurality of inputs and issue an output signal when all of their inputs receive a signal are represented by AND 31. Gates which have a plurality of inputs and issue an output when any one or more inputs receive signals are represented by OR 66. Signals are maintained as by MEMORY FLIP-FLOP 44 having a "set" input and a "set" output designated by s and a "reset" input designated by rs whereby the momentary application of a signal to a "set" input causes the bistable circuit to transfer its "set" from a no signal condition to a signal condition. The output signal is maintained until a signal is applied to the "reset" lead. A momentary application of a "reset" signal resets the flip-flop "set" output to a no signal state. Time delays for signals as in TIME DELAY 40 can be by means of a resistance-capacitance controlled unijunction timer which issues a signal a given interval after a signal is imposed on its input. A timed pulse source 39 can be in the form of a multivibrator and can cooperate with a counter which might be a binary counter of cascaded flip-flop stages. The system also employs INVERTERS as 71 which issue a signal at their output when no signal is imposed on their input and issue no signal at their output when a signal is on their input.

Loading of the mold is indicated by gating AND 31 upon the coincidence of a "mold opened" signal and a "blank inserted" signal on leads 21 and 20. AND 31 sets the flip-flop 32 as a memory in response to the signal on its "set" input 33 to maintain a signal on "set" output 34 until a "reset" signal is imposed on lead 35 when the cured part is removed from the mold.

The start of the molding and curing cycle gates AND 36. Enabling signal on lead 34 for the loaded mold when coincident with a signal from lead 37 of gated AND 38 gates AND 36 to indicate the cycle has begun. AND 38 is gated when the mold is closed and pressure and heat are applied to initiate the molding. Coincidence of signals "mold closed" on lead 22, "pressure applied" on lead 24, and "heat applied" on lead 27 gate AND 38.

Timing of the molding cycle is by means of a count of timed pulses. A generator 39 of timed pulses such as a multivibrator can be arranged to issue pulses at regular intervals of time on lead 41 to a counter 42. Count outputs can be coupled to the "set" inputs of flip-flops which are memories which remain set during the interval they define so that the flip-flops are set at the beginning of an interval defined by the count. The flip-flops will issue a set output during the interval they are to define and they are reset by the pulse from the counter defining the end of the time interval. For example, a short interval could be from 4 minutes to 5 minutes. If the pulse generator issues a pulse each half minute the "set" input 43 of short interval flip-flop 44 is coupled to a counter output for the count of eight and its "reset" input 45 is coupled to the counter output for the count of 10. Similarly, the long interval flip-flop 46 is set and reset by counter outputs for the long interval limits.

Pulse generator 39 is placed in operation by setting flip-flop 47 at the start of the mold cycle as indicated by a gated signal from AND 36 to "set" input 48. Timing is continued until flip-flop 47 is reset when a part is removed from the mold. In this manner an excessive interval in the mold results in the resetting of both time interval flip-flops 44 and 46 so that no time interval is registered by either flip-flop when a signal is present on lead 23. If a time interval is indicated by a signal from flip-flop 44 or 46 where the part is removed from the mold and a signal is present on lead 23, the readout of the process parameters will be accomplished and after a delay of the signal on lead 23 in delay circuit 40 it will be passed to blocking rectifier 50 and the "reset" inputs for the flip-flops 44 or 46. This delay is utilized for readout since the termination of the process requires an enabling signal from the lead 23 prior to the reset of the timing memories 44 or 46.

Grading of the product of the mold cycle is based upon the combination of: cure interval, defined by flip-flops 44 or 46; temperature, indicated by signals on 28 for a high temperature within acceptable limits or 29 for a low temperature within acceptable limits; and pressure within the mold, signified as within high limits by a signal on lead 25 or within low limits by a signal on lead 26.

Completion of a cycle is indicated by removal of the part from the mold. This imposes a signal on lead 23 which enables each of the grading ANDs 51 through 57 and thereafter causes time delay 40 to issue a reset signal on lead 59 to the several flip-flops 32, 44, 46 and 47 providing memory functions. In this manner the grade is first indicated and then the monitoring system is reset for its next monitoring cycle.

A first grade product results from a short interval cure at a high pressure within the acceptable range and high temperature within the acceptable range, AND 51 is gated for a first grade product to issue a signal on lead 61. This requires a coincidence of the "removal of part from mold" signal on lead 23, a "short cure interval" signal on lead 62, a "high-temperature range" signal on lead 28, and a "high-pressure range" signal on lead 25.

A second grade product can be produced by a long mold cure at high pressure and high temperature by gating AND 52, a long mold cure at low pressure and high temperature to gate AND 53, or a long mold cure at low temperature and high pressure to gate AND 54. When ANDs 52, 53 or 54 are gated they issue signals on leads 63, 64 or 65 respectively, which can be utilized individually (by means not shown) or can each be applied to OR 66 to gate a signal from its output 67 indicating a second grade product.

Rejects result if the mold cycle is completed without producing either a first or second grade product. AND 57 is gated upon removal of a part from the mold by a signal on lead 23 and a signal on leads 68 and 69 when neither a first nor a second grade signal is present on leads 61 and 67. Each of leads 68 and 69 is respectively coupled to leads 61 and 67 respectively through an inverter as at 71 and 72 respectively whereby the absence of a gated signal to leads 61 and 67 result in a signal on each of leads 68 and 69 indicating no first or second grade mold cycle.

Reject signals are issued on lead 73. Where rejects result from improper relationships of parameters within the parameter limits defined. Individually identified reasons for rejects can be ascertained from signals on leads 74 and 75 as gated from ANDs 55 and 56. A mold cycle for a short interval with a low temperature and a high pressure applies signals to each of leads 62, 29, 25 and 23 to gate AND 55. A mold cycle for a short interval with a high temperature but at a low pressure applies signals to each of leads 62, 28, 26 and 23 to gate AND 56.

Where a universal "reject" signal is desired the signals on leads 73, 74 and 75 can be applied to OR 76 to gate a signal to lead 77.

Similar combinations of ANDs, ORs, INVERTERs, DELAYs and MEMORIES can be employed with TIMERs to sense the transfer interval from the mold to the post mold cure in a second process of the product and to relate that transfer time with the previous grade of the mold cure and the parameters of the post mold cure as temperature, pressure and time to develop a grade indication for each product of the post mold cure.

Thus, counts are available for various grades of cure of the product sensed by the sequence, values and relationship of the processing parameters imposed during the molding and curing cycle. Such output signals can be applied to registering means for inventory control to accumulate the number of cycles which produced the several grades of product at the work station.

The elements disclosed in FIG. 2 can be programmed into a computer such as a plant process control computer. Further, they can be introduced into the computer in an on-the-line manner by addressing the computer to the work station periodically and sampling the condition of the sensing devices for that work station to which the elements programmed to that work station are responsive. FIG. 3 represents a system for monitoring a plurality of process parameters and utilizing those parameters in an on-the-line computer for grading and counting products from a work station. In order to efficiently utilize the computer without requiring storage of information bits between the workstation transducers sensing the process parameters and the computer inputs, the computer is arranged to sample the condition of the transducers at a frequency which insures at least two scans of any transducer input during any state of those inputs.

The parameter sensing devices also enter into the process control by actuating a process sequence control (not shown). The computer to which the sensing devices are coupled has interval timers programmed to be responsive to the sensing devices (by means not shown) to provide the grading and counting of this system. In this system the mold is opened and the blank to be molded and cured inserted. Upon closing the mold a timer in the process sequence control starts timing the total cure time in the mold and imposes heat and pressure. The temperature and pressure sensing devices are responsive to critical values so that upon achieving the required temperature and pressure, as by the admission of steam to a mold jacket (not shown) and an internal bladder (not shown), the source of heat and pressure, the steam, is cut off and the monitoring system is informed of this cutoff. The mold is opened by the release of the process sequence control and the finished part is moved to a post mold cure station where it is subject to pressure, and heat for a time. Variations in these processing steps as in the time required to bring the mold up to temperature and pressure, the time to transfer a mold cured part to the post mold cure station and the time required to bring the part up to temperature and pressure in the post mold station which will determine the grade of cure and thus the grade of the finished part.

The system shown in FIG. 3 includes a source of alternating current connected across buses 81 and 82 to which various sensing devices are connected in circuit with isolating transformers 83. The secondaries of the isolation transformers are each connected to rectifying bridges 84 to supply individual control relays CR1 to CR3. These relays each have a contact in the input circuits for the computer whereby the contacts can be scanned periodically.

Limit switch 85 is provided on the mold to respond to its closing by energizing relay CR1. Limit switch 86 senses the manipulation of a mold cured part in the path from the mold to the second curing station to momentarily close a circuit energizing relay CR3. Pressure switch 87 is closed when the pressure in a bladder which is fitted within the blank to be molded is raised to a predetermined level as by steam or air and temperature switch 88 responds to the heating of the mold to the curing temperature as by electric heating or steam. When both of series connected switches 87 and 88 are closed, a circuit is completed for control solenoid 89 to terminate the application of heat and pressure to the mold and the part therein. Control relay CR2 is energized at this time to close its contact in the computer input. At an appropriate time the sequence control for the mold opens the mold and the part is removed and manipulated to a second cure station. During this manipulation it closes limit switch 86 to energize relay CR3 and close its contact in the computer input circuit.

In the second cure station the part is again heated, its internal bladder is inflated and it is subjected to the heat at a given temperature and a given pressure for a predetermined interval. A circuit senses a coincidence of the temperature, pressure and end of interval through the closure of series connected switches including pressure switch 91 which closes when the pressure in the bladder is at a predetermined level, temperature switch 92 which closes when the temperature is at a predetermined level, and time switch 93 which is closed for the interval of the second cure cycle. A source of direct current coupled to terminals 94 and 95 energizes control relay CR4 while there is a coincidence of closure of switches 91, 92 and 93.

Each of the control relays has its coil shunted by a capacitance 96 to delay its drop out whereby its contact in the computer input is closed for at least two scans for any energization of the relay.

Signals are addressed in the computer to sections thereof assigned to the product grading and counting for the work station. A plurality of similar work stations can be coupled to the same inputs. This is accomplished by a ground selectively coupled to a common terminal of each set of work station inputs as represented by the contact arm 97 coupled to terminals 98 and 99 shown in an arcuate array. Thus terminal 98 is engaged to provide a common ground on lead 101 for each of the circuits including a control relay contact for the first work station. In the next step of the scan, contact 99, is engaged to ground lead 102 common to the control relay contacts for station B as CR1B to CR4B. Each control relay contact circuit has an output with a scan means synchronized with the scan of the common lead so that when the work station A is grounded its outputs to the computer are routed to the sections for the A-station and when the B-station is grounded those outputs are to the B-station sections, etc. The output scan is as at 103, 104, 105 and 106 to computer section terminals as at 107 and 108, 109 and 111, 112 and 113, and 114 and 115.

In practice the computer will count an A-grade product cure when the temperature and pressure reach their prescribed values as signified by the energization of relay CR2 within a proper interval relative to the initiation of the cycle as indicated by the initial energization of relay CR1 as further qualified by a proper post mold cure. The A-grade requires timely manipulation of the part from the mold to the second cure station as signified by energization of relay CR3 and a second cure for a proper interval as defined by energization of CR4.

A B-grade count of a product cure and thus a B-grade product will be made if the time interval either of the mold cure, as the time to reach temperature and pressure indicated by CR2 is out of the A-range but within a looser limit set for the B-range, the time to manipulate the product to the second cure station is out of limits for A-grade; or the time in the second cure is out of the A-grade range but within the B-grade range. The computer will count an unsatisfactory cure and a reject product if the time intervals in the mold cure or in the second cure are outside the limits set for the A- and B-grades.

Advantageously the computer can be programmed to respond only to a change in state of a scanned circuit which persists through at least two scans. In the case of relays CR1 and CR4 the relay contacts are ordinarily maintained closed for substantial intervals spanning many scans, hence readout is a straight forward matter. In the case of relays CR2 and CR3 the energization may be only momentary. Under these circumstances the delayed dropout of relays by capacitances 96 causes the relay in question to be scanned in at least two successive scans as pulled in to register the factors represented. This minimizes response to spurious signals of a random nature since the computer will respond only to an "on" signal when it is preceded by at least two successive "off" signals and is represented by two successive "on" signals and, conversely, will respond to an "off" signal only when represented by two successive "off" signals preceded by two successive "on" signals.

It is to be appreciated that the present system of grading and counting discrete productive cycles or products of those cycles lend themselves to variation as to the parameters sensed, the combinations of parameters and their relationships. Further different combinations can result in the same grade of process or product as where one parameter value compensates for another. The use of plural parameters and the relationships of parameters for each process of product grade or count is not to be interpreted as restricted to the specific embodiments disclosed but rather is set forth as illustrative.

I claim:

1. A system for grading and counting products during processing of the products comprising means sensing a first parameter of the process other than time which is imposed on the products during processing; means sensing a second parameter of the process other than time which is imposed on the products during processing; means responsive to the relationship between said first and second parameters sensed by said first and second means to indicate a first grade for the products for a first relationship and a second grade for the products for a second relationship.

2. A combination according to claim 1 wherein said relationship is the magnitudes of said first and second sensed parameters.

3. A system for grading and counting products during processing of the products comprising means sensing a first parameter of the process other than time which is imposed on the products during processing; means sensing a second parameter of the process other than time which is imposed on the products during processing; and means responsive to the sequence in which given values of said first and second parameters are achieved as sensed by said first and second means to indicate a first grade of the products for a first sequential relationship and a second grade for the products for a second sequential relationship.

4. A combination according to claim 3 wherein said sequential relationship is the time interval between said parameters.

5. A system for grading and counting products during a processing step of the products comprising means sensing a first parameter of the process other than time which is imposed on the products during the processing step; means sensing a second parameter of the process other than time which is imposed on the products during the processing step; means responsive to the initiation of the processing step, means sensing the time interval from the initiation to the termination of the processing step; and means responsive to the relationship between said first and second parameter sensed by said first and second means and to the time interval of said processing step to indicate a first grade for the products for a first relationship and a second grade for the products for a second relationship.

6. A combination according to claim 1 including means responsive to relationships between said first and second parameters outside the relationships indicating a first or second grade for indicating a third grade for said product.

7. A combination according to claim 6 wherein said third grade is a reject.

8. A combination according to claim 1 wherein said system for grading and counting the products is effective during a second processing applied to the graded products of the first mentioned processing including means sensing a parameter of said second process during the application of the process to the products; and means responsive to predetermined relationships of the values of said second parameter and said grade of the graded products of the first mentioned processing to indicate a first grade for the products of said second process for a first relationship and a second grade for the products of said second process for a second relationship.

9. A combination according to claim 8 including means sensing the initiation of a second process applied to the graded products and wherein the second parameter is the time interval between said first and second process applied to the products.

10. A combination according to claim 1 wherein said system for grading and counting the products is effective during a second process applied to the graded products of the first mentioned processing including means sensing a first parameter of said second process during the application of the process to the products; means sensing a second parameter of said second process during the application of the process to the products, and means responsive to predetermined relationships of the values of said first and second parameters of said second process and said grade of the graded products of the first mentioned processing to indicate a fist grade for the products of said second process for a first relationship and a second grade for the products of said second process for a second relationship.

11. A combination according to claim 8 including means responsive to relationships between said parameter of said second process and said grade of the graded products outside said relationships of said first and second grades for the products of said second process for indicating a third grade for the products of said second process.